(12) United States Patent
Magid

(10) Patent No.: US 6,584,712 B2
(45) Date of Patent: Jul. 1, 2003

(54) SHOPPING CART DISPLAY DEVICE

(75) Inventor: Edward Magid, Ivyland, PA (US)

(73) Assignee: FLOORgraphics, Inc., Princeton, NJ (US)

( * ) Notice: Subject to any disclaimer, the term of this patent is extended or adjusted under 35 U.S.C. 154(b) by 0 days.

(21) Appl. No.: 09/753,115

(22) Filed: Jan. 2, 2001

(65) Prior Publication Data

US 2002/0083628 A1 Jul. 4, 2002

(51) Int. Cl.[7] .................................................. G09F 3/00
(52) U.S. Cl. ...................................... 40/308; 40/642.02
(58) Field of Search ............................ 40/308, 642.02, 40/643, 649, 651, 654.01, 661, 665, 617, 781

(56) References Cited

U.S. PATENT DOCUMENTS

| 1,566,167 | A | * | 12/1925 | Petersen et al. | 40/643 |
| 1,583,626 | A | * | 5/1926 | Swarts | 40/643 |
| 4,044,485 | A | * | 8/1977 | Hopp | 40/651 X |
| 4,314,417 | A | * | 2/1982 | Cain | 40/209 |
| 5,210,968 | A | * | 5/1993 | Rehrig | 40/308 |
| 5,235,767 | A | * | 8/1993 | Waterman et al. | 40/308 |
| 5,608,978 | A | * | 3/1997 | Sawyer et al. | 40/308 |

FOREIGN PATENT DOCUMENTS

| EP | 323766 | * | 7/1989 | 40/308 |

* cited by examiner

Primary Examiner—Brian K. Green
(74) Attorney, Agent, or Firm—Armand M. Vozzo, Jr.

(57) ABSTRACT

An improved display device is disclosed for holding an advertisement or the like in a card or sheet-like form upon a shopping cart. The display device comprises a base panel having a substantially rectangular body and a plurality of longitudinal slots formed therethrough, the slots extending across the body of the base panel in separate radial and tangential directions to provide multiple areas of access to the shopping cart wall for balanced mounting of the device. Each of the slots is further provided with a support post extending centrally across the width of the slot to provide support for the attachment to the shopping cart wall by means of conventional cable ties. A cover frame adapted to releasably engage the base panel around the periphery thereof is formed having a substantially rectangular outer configuration and a rectangular aperture through the thickness thereof to provide a viewing window for the advertisement displayed through the frame.

14 Claims, 5 Drawing Sheets

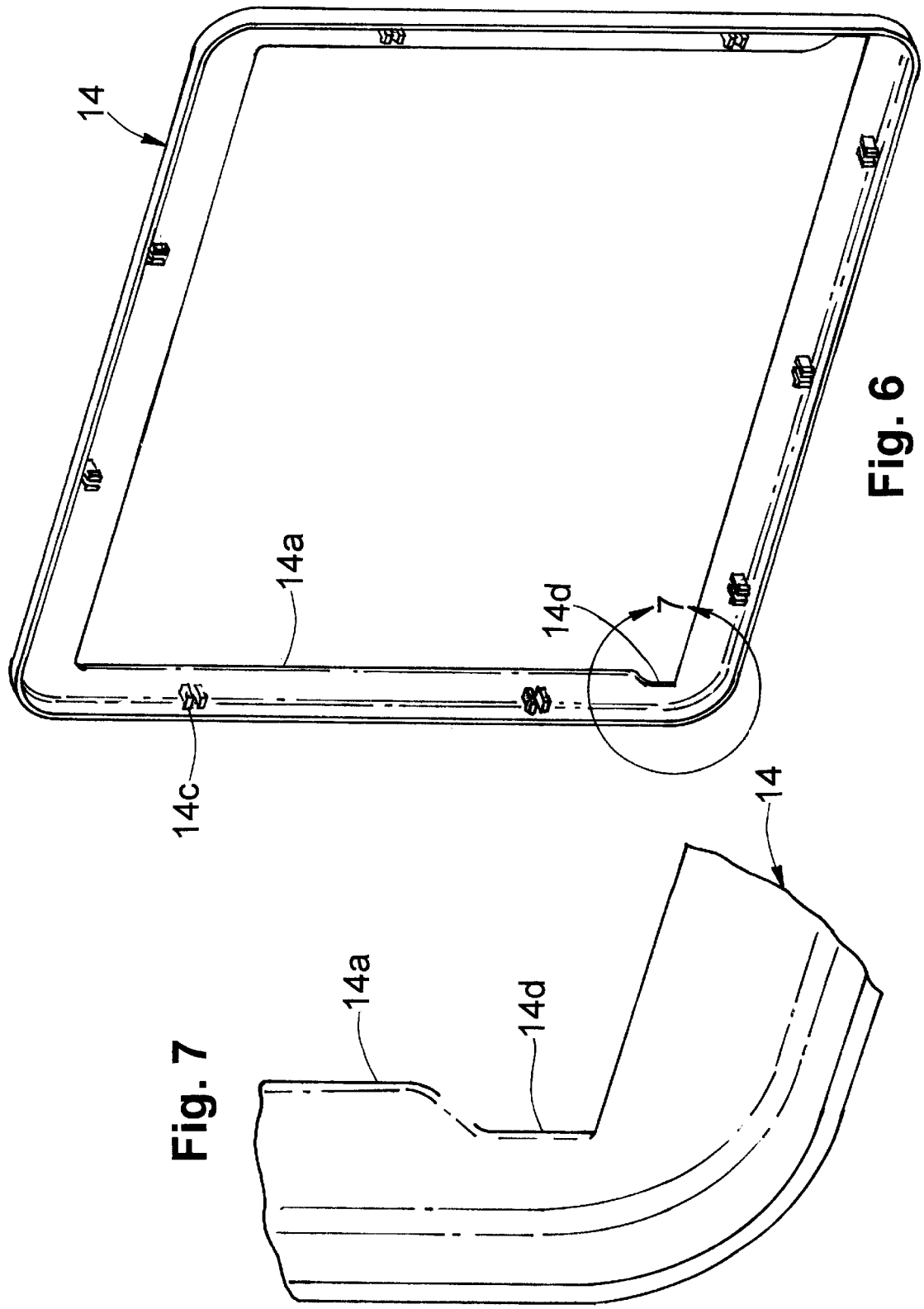

SHOPPING CART DISPLAY DEVICE

BACKGROUND OF THE INVENTION

The present invention relates to display systems of the type adapted to be mounted on a shopping cart to present promotional advertising and other information of interest to shoppers, and more particularly to an improved shopping cart display device having a specially configured base panel and interlocking cover frame that together mount securely to virtually all styles of shopping carts and further facilitate a change in the displayed information without disturbing the mounted device.

Advertising literature and other promotional materials have long been displayed on the structural parts of a shopping cart to permit merchants to advertise or promote various items to their customers. Such advertising displays have been conventionally used and mounted on the handle and various basket sidewalls of the shopping cart on both outer and inner sides thereof to provide maximum exposure to customers of the items being promoted. These advertising displays commonly comprise a plate-like base member of a substantially rectangular configuration and a separate ring-like cover member of the same rectangular configuration which releasably engages and overlies the base member to hold a disposable sheet-like advertisement therebetween. The advertisement is generally printed on a card or sheet of paperboard that is initially positioned within the display and later removed and discarded when necessary.

Engagement of the display elements, particularly the cover and base members, and their mounting attachment to the shopping cart have been effected using a variety of fastener means. One common group of known display units employs a hinged connection between the base and cover members while another, to avoid problems associated with hinge failure, employs totally separate base and cover members and provides for their engagement using releasable latch structures that cooperate between the members along their respective rims. While this latter group of hinge less display units has been generally satisfactory in the visual presentation of its advertisement on the shopping cart, it has been found somewhat disadvantageous in the process of changing the advertisement, as is required from time to time, particularly where total removal of the cover member is required. Such action requires the attendant to manipulate both the cover member and the advertisement while at the same time positioning them relative to the shopping cart. While such completely separable, non-hinged display units are generally favored over those with hinged connections of the base and cover members, they are more difficult to manipulate with respect to insertion and removal of advertisements. Furthermore, despite the variety of fastener means used in the past to secure these display units, particularly the base member thereof, to the shopping cart structure, there has been no adequate combination of fastener means and base member structure that allows universal mounting of the display to virtually any type of shopping cart structure.

SUMMARY OF THE INVENTION

Accordingly, it is a general purpose and object of the present invention to provide an improved device for displaying advertisements or like promotional material upon shopping carts that is easier to mount and manipulate on the shopping carts than those display units heretofore developed.

A more particular object of the present invention is to provide an improved shopping cart display device that can be securely mounted in a proper attitude upon virtually any shopping cart structure and be easily removed therefrom without damage.

Another object of the present invention is to provide a display device for mounting upon a shopping cart that allows for easy installation and removal of advertisements, when needed, without disturbing the mounted position of the device.

Still another object of the present invention is to provide a shopping cart display device that presents a more attractive picture-like image of advertising copy and associated artwork displayed therein for greater impression upon the shopping customer.

A still further object of the present invention is to provide a reusable display device for shopping carts that is reasonably inexpensive to manufacture, easy to assemble and reliable in its operation.

Briefly, these and other objects of the present invention are accomplished by an improved display device for holding an advertisement or the like in a card or sheet-like form upon a shopping cart. The display device comprises a base panel having a substantially rectangular body and a plurality of longitudinal slots formed therethrough, the slots extending across the body of the base panel in separate radial and tangential directions to provide multiple areas of access to the shopping cart wall for balanced mounting of the device. Each of the slots is further provided with a support post extending across the width of the slot intermediate of the ends thereof to provide support for the attachment to the shopping cart wall by means of conventional cable ties. The display device further comprises a cover frame formed having a substantially rectangular outer configuration similar to that of the base panel and further formed having a rectangular aperture through the thickness of the frame thereby providing a rim section with a viewing window through the frame. The base panel and cover frame are assembled and releasably engaged by means of a series of clip members formed on the reverse side of the rim section that align with and engage a series of squared openings formed around the periphery of the base panel. Notched corners formed on the lower corners of the rim section of the cover frame allow the advertisement card or sheet to be inserted and removed without disassembling or detaching the device from the shopping cart.

For a better understanding of these and other aspects of the present invention, reference should be made to the following detailed description taken in conjunction with the accompanying drawings in which like reference numerals and characters designate like parts throughout the figures thereof.

BRIEF DESCRIPTION OF THE DRAWINGS

For a fuller understanding of the nature and object of the present invention, references in the detailed description of the preferred embodiment set forth below shall be made to the accompanying drawings in which:

FIG. 6 is a rear perspective view of the cover frame of the present invention shown separated from the assembled display device of FIG. 3; and FIG. 7 is a detailed front perspective view of the notched corner of the cover frame indicated in FIG. 6.

DETAILED DESCRIPTION OF THE INVENTION

The following is a detailed description of the preferred embodiment of the present invention and the best presently contemplated mode of its production and practice. This description is further made for the purpose of illustrating the general principles of the invention but should not be taken in a limiting sense, the scope of the invention being best determined by reference to the appended claims.

Figure 1:
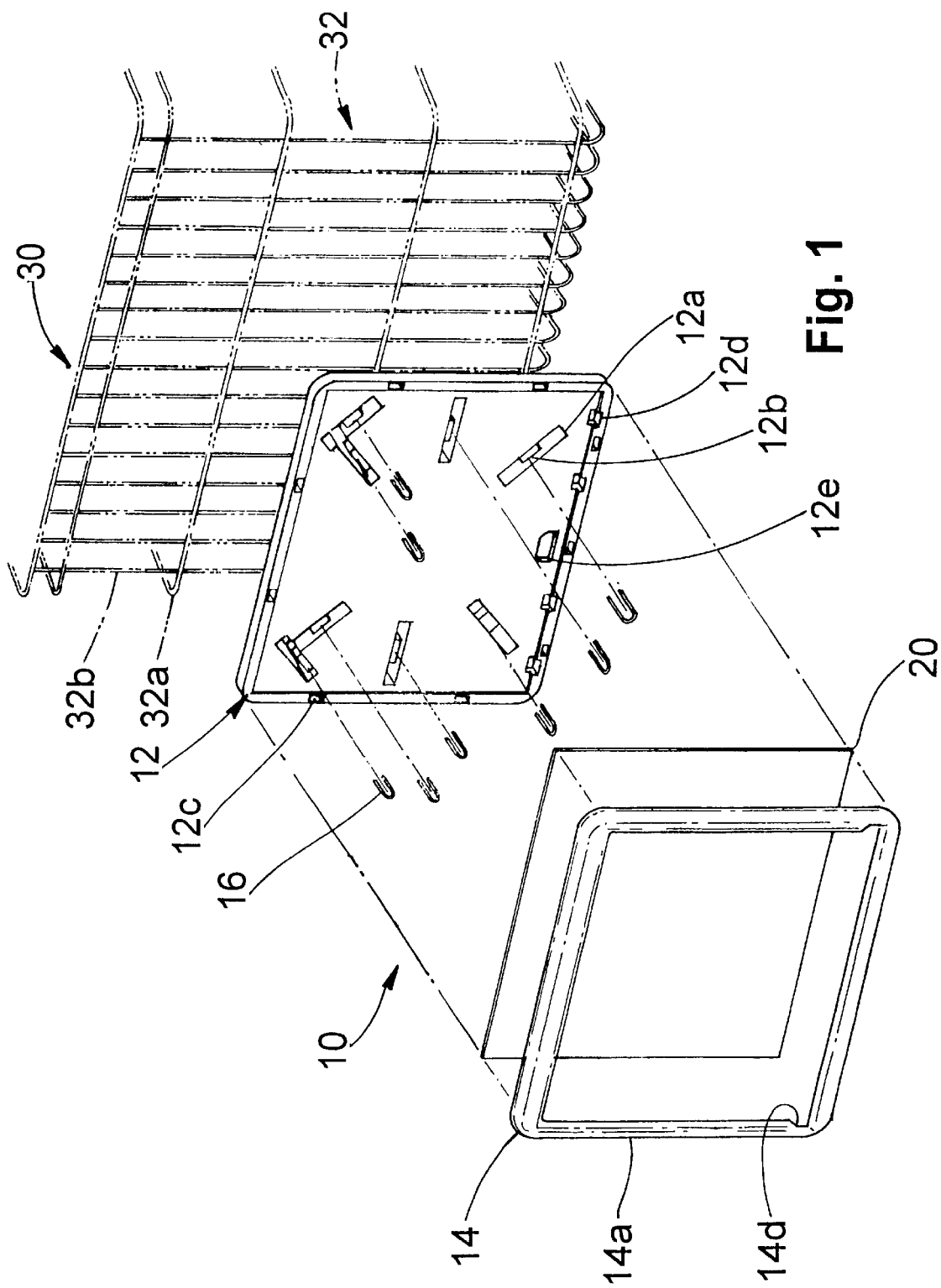
FIG. 1 is an exploded perspective view of a preferred embodiment of the display device of the present invention shown together with an advertisement sheet intended for display as they would be together mounted on the forward basket wall of a typical shopping cart.

Referring now to the drawings and particularly at first to FIG. 1, the display device of the present invention, generally designated 10, is shown in its intended assembly and mounted attachment upon a wall section 32 of a conventional shopping cart 30. The shopping cart 30 and its wall section 32, as shown, are typically constructed of a rigid wire material assembled in horizontal and vertical members, 32a and 32b, respectively, formed into a wire basket for holding items to be purchased by a shopper. It should be understood that while the shopping cart 30 of wire construction is shown for purposes of this description of the display device 10, the present invention may be similarly employed and used in connection with other standard shopping cart constructions, such as those of plastic and the like, currently employed in retail supermarkets.

In accordance with the present invention, the display device 10 comprises a base panel 12 having a substantially rectangular body and a cover frame 14 of a similar rectangular configuration, each assembled together to hold an advertising sheet or card 20 in place therebetween for display upon the shopping cart 30. Both the base panel 12 and cover frame 14, each described below in greater detail, are substantially planar members that are rigid yet bendable to some degree and preferably formed from a strong and durable material, such as plastic. The advertising sheet 20 is generally rectangular in shape and sized in its length, width and thickness to fit snugly within the interior space formed between the assembled base panel 12 and cover frame 14, the advertising sheet being sufficiently thin and flexible to be inserted into and withdrawn from the interior space position by hand. A pair of notched corners 14d on either side of the frame cover 14 serve in conjunction with a finger well 12e formed on the lower part of base panel 12, both being described in greater detail below, to allow the advertising sheet 20 to be easily inserted and removed, when desired, without having to disassemble the display device 10 or detach it from the shopping cart 30.

The display device 10 of the present invention is intended to be fastened and mounted upon the shopping cart 30 using a plurality of conventional cable ties 16, each tie being separately deployed and routed through one of a respective plurality of longitudinal slots 12a formed through the body of base panel 12 and described in greater detail below. The preferred cable ties 16 are commercially available binding fasteners typically made of a plastic material and formed in a belt-like configuration that allows the ties to self-engage and lock in a looped closure. When deployed in the present invention, the cable tie 16 is routed through a respective slot 12a on the base panel 12 and extended further through the wall section 32 of the shopping cart 30 between the proximate horizontal and vertical wire members 32a, 32b. Once extended through the shopping cart wall 32, the cable tie 16 is looped back through the slot 12a on base panel 12, wrapped about one or more of the adjacent horizontal and vertical wire members 32a, 32b. The cable tie 16 is then drawn tightly through the slot 12a to bring the base panel 12 immediately adjacent to and flat against the shopping cart wall 32 before being engaged and locked in place within the slot supported about a support post 12b formed transversely through the slot and described in greater detail below. The cable ties 16 may be of various starting lengths but should be sufficiently long, typically about twelve inches, to facilitate their handling and routing through the base panel 12 and around the proximate horizontal and vertical wire members 32a, 32b on the shopping cart wall 32 and further to allow for some positional adjustment, upward or downward and side to side, in the mounted location of the display device 10 on the shopping cart wall. After the cable tie 16 is properly routed about the shopping cart wall 32 and locked in place around the support post 12b within a respective longitudinal slot 12a, the excess length of the cable tie should be removed to maintain a smooth rounded appearance to the closed tie and further eliminate sharp projections from the mounted display device 10. The number of cable ties 16 required for mounting of the display device 10 may vary depending upon the structure of the shopping cart wall 32 and the variation of the horizontal and vertical members 32a, 32b thereof, with at least two symmetrically positioned ties being generally necessary to hold the device in a firm level position on the wall section of any conventional shopping cart.

Figure 2:
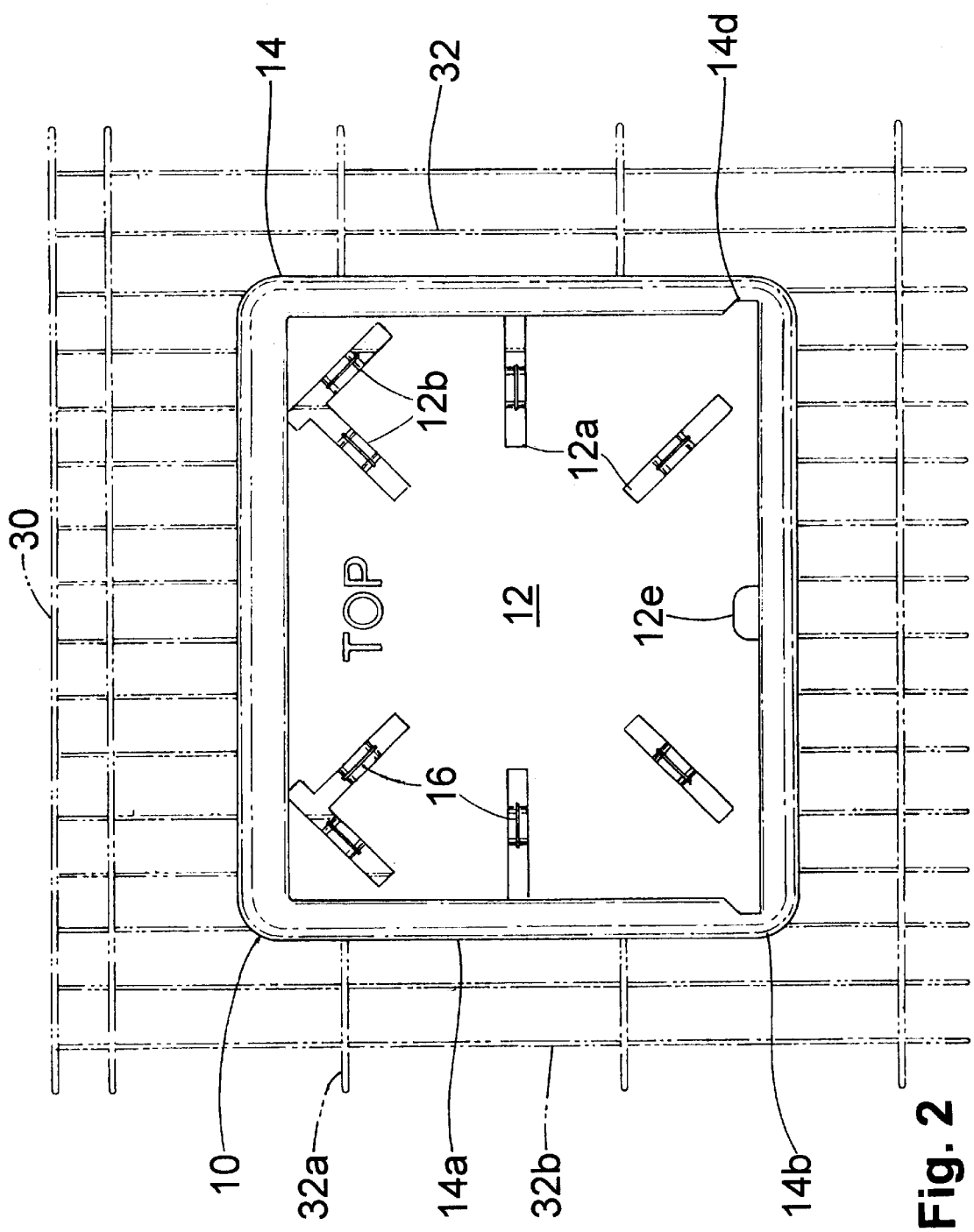
FIG. 2 is a front elevation view of the display device of FIG. 1 assembled and mounted on the basket wall of the shopping cart and shown without the advertisement sheet.
Figure 3:
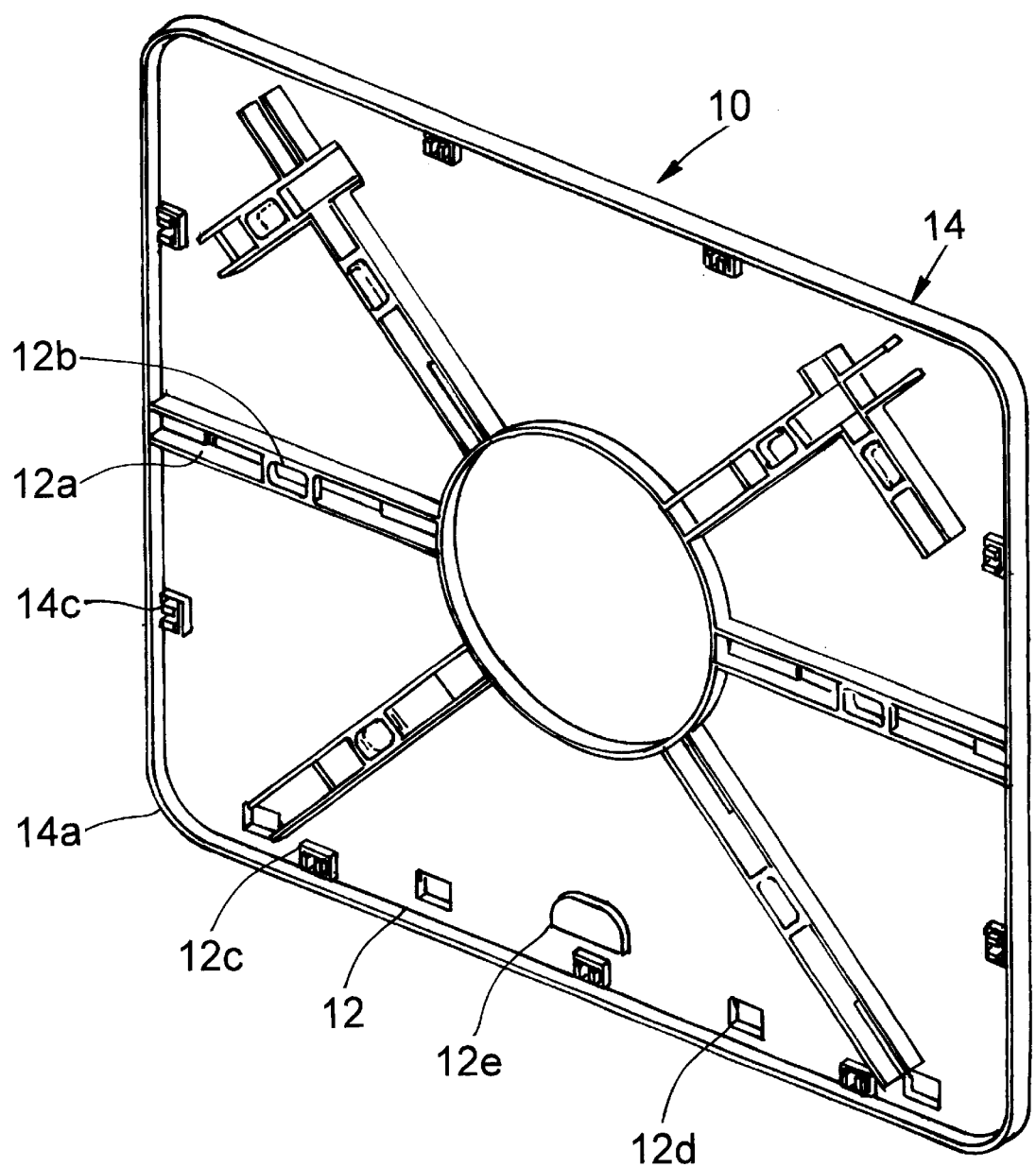
FIG. 3 is a rear perspective view of the assembled display device of FIG. 2 shown removed from the shopping cart.

Referring now to FIGS. 2 and 3 in conjunction with FIG. 1, the assembled display device 10 with the cover frame 14 engaged upon the base panel 12 is held firmly and flatly against the shopping cart wall 32 in a substantially level position that resists rotation due to the supported binding of the horizontal and vertical members 32a, 32b by the cable ties 16 accessed through the plurality of longitudinal slots 12a. As best viewed in FIG. 2, the longitudinal slots 12a are each made through the body of base panel 12 in the form of a closed channel substantially rectangular in its configuration with each slot having essentially the same length and width. Except for the pair of uppermost slots 12a, the separate slots are linearly formed and radially directed relative to the center of the base panel 12. The uppermost pair of slots 12a located on opposite sides of the base panel 12 are essentially an L-shaped combination of the linear slots one segment of the uppermost slots being in a radial direction and the other segment being perpendicular thereto in a substantially tangential direction relative to the central axis of the base panel 12. The group of slots 12a thus formed in the body of base panel 12 are arranged in a substantially radial pattern and are made to extend outward from the center of the base panel in multiple directions to provide increased areas of access through the base panel to the horizontal and vertical members 32a, 32b of the shopping cart wall 32 for a more effective and balanced mounting of the display device 10.

Each of the longitudinal slots 12a contains a support post 12b transversely extending across the width of the slot and located intermediate of the ends of the slot near the middle of its length. As better seen in FIGS. 4 and 5, each support post 12b is integrally formed as part of the base panel 12 to provide firm support for the cable ties 16 and their binding connection of the base panel to the shopping cart wall 32. Of course, the support posts 12b may be attached to the base panel 12 and secured within respective slots 12a as separate members to provide the equivalent support and area of binding attachment between the display device 10 and the shopping cart 30. The forward surface of each support post 12b that engages the cable ties 16 on the front of base panel 12 should be relatively smooth and flat with rounded edges to promote and maintain effective surface contact with the cable ties. The width of each support post 12b across its forward surface should be sufficiently broad and not narrow to provide an optimum surface area for contact with the cable ties 16 and a better distribution of the binding forces along the ties.

The cover frame 14 is formed to engage the front of base panel 12 and surround the outer periphery thereof along a rim section 14a of the frame. As better seen in FIG. 3 and best viewed in FIG. 6, the rim section 14a engages the periphery of the base panel 12 via a series of spring clips 14c integrally formed on the rear surface of the rim section and made to project therefrom at spaced locations along the interior length of each side of the rim section. The spring clips 14c are formed having a square profile that slides through and engages a corresponding series of square opening 12c formed through the base panel 12 and located along the periphery thereof. Each of the spring clips 14c comprise a pair of outwardly urging fingers spaced apart to allow sufficient inward deflection for entering the respective square opening 12c of the base panel 12 and further configured to lockingly engage the opening upon entry therethrough. With the cover frame 14 thus locked together with the base panel 12, as illustrated in FIGS. 2 and 3, a substantially rectangular aperture is provided by the rim section 14a over top of and around the periphery of the front of the base panel in such a way as to provide clear access to the longitudinal slots 12a and associated support posts 12b for attaching or detaching the display device 10 with the advertising sheet 20 removed and a substantial viewing window for the advertising sheet when inserted. It should be further noted that, with respect to the relative position of the base panel 12 and the cover frame 14 when assembled and engaged together for mounting, the finger well 12e on the lower part of the base panel is located along and just above the bottom side length of the rim section 14a substantially in line with the notched corners 14d on either side of the frame cover, making the finger well fully accessible for a handler when inserting and removing the advertising sheet 20 along the bottom of the display device 10.

Figure 4:
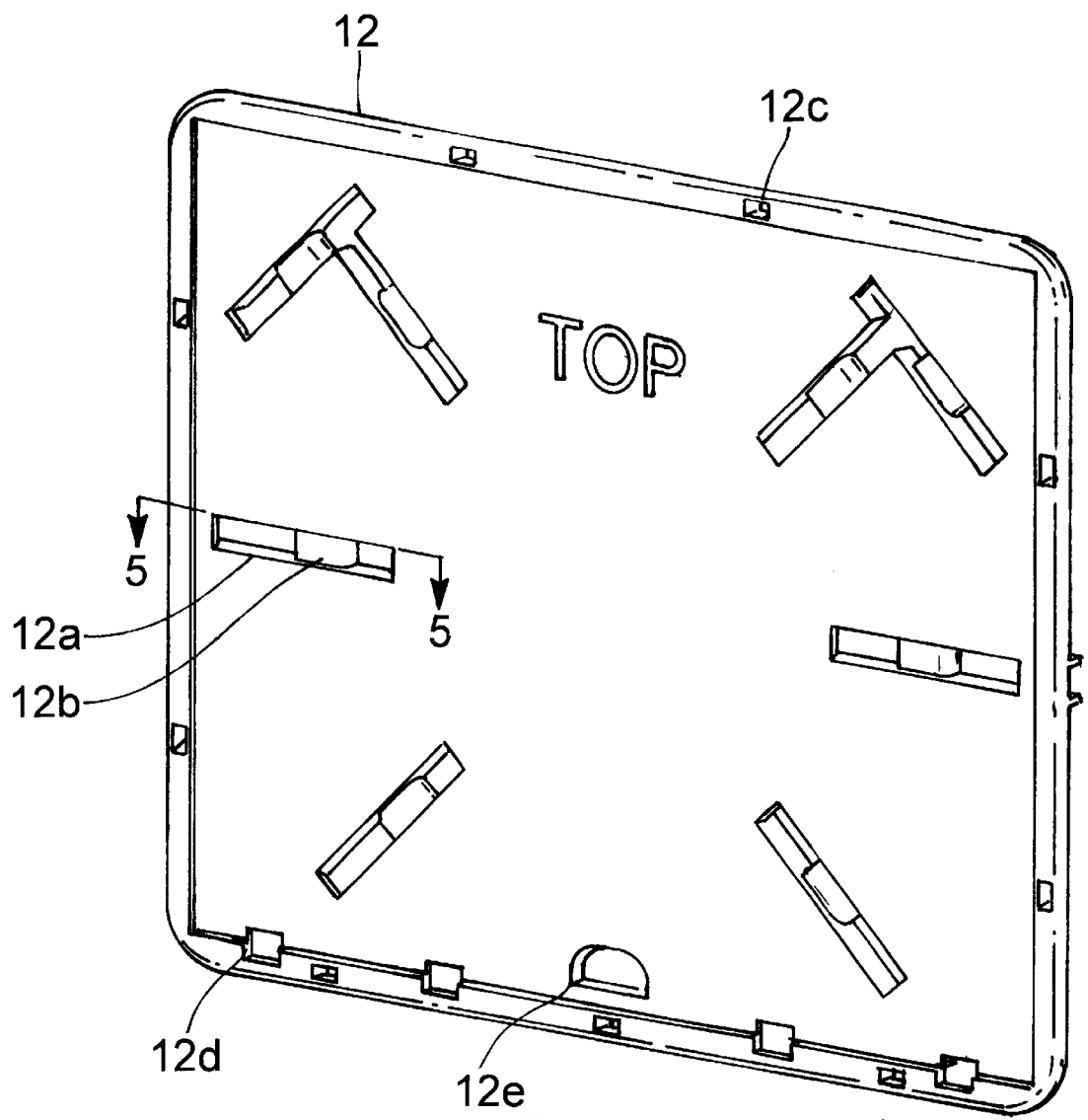
FIG. 4 is a front perspective view of the base panel of the present invention shown separated from the assembled display device of FIG. 3.
Figure 5:
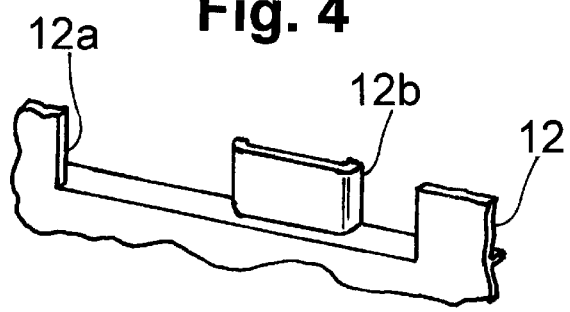
FIG. 5 is a sectional view taken along the line 5—5 in FIG. 4.

Referring now to FIGS. 4 and 5 in conjunction with the foregoing FIGS. 1–3, the base panel 12 is formed and intended for assembly having the L-shaped slots 12a disposed on either side of the upper part of the body of the panel and the finger well 12e located centrally along the bottom side thereof. The finger well 12e is a substantially semicircular depression formed in the body of the base panel 12 that allows the fingers of the handler of the advertising sheet 20 to press it slightly into the assembled display device 10 in order to facilitate its handling during the placement and withdrawal of the sheet. Employed in conjunction with the notched corners 14d on the frame cover 14, the finger well 12e provides easy and non-destructive handling of the advertising sheet 20 with respect to its use in the display device 10 of the present invention.

Further along the bottom of base panel 12 just below the location of finger well 12e, a series of drain holes 12d is formed, each drain hole being made through the body of the base panel having a substantially square configuration similar to the square openings 12c but relatively larger in size. The drain holes 12d are spaced apart and spread across the bottom of the base panel 12 so that upon assembly to the frame cover 14 and mounted use upon shopping cart 30, any water entering the display device 10 from rain, snow or condensation will gravitate downward through the assembled device and be removed therefrom via the drain holes thereby reducing the risk of damage to the display device commonly caused by water and ice build-up.

As best viewed in FIG. 5, the support post 12b that transversely extends across the width of each longitudinal slot 12a in the base panel 12 is recessed slightly from the forwardmost surface of the base panel. Such a recess between the front surface of each support post 12b and the forwardmost surface of the base panel 12 allows the portion of the cable tie 16 used in the respective slot 12a for binding the shopping cart wall 32 to rest wholly in the respective slot without protruding therefrom and projecting into the advertising sheet 20.

Referring now to FIGS. 6 and 7 in conjunction with the foregoing FIGS. 1–5, the frame cover 14 is provided with rounded outer corners 14b that provide the substantially rectangular rim section 14a with a picture-frame appearance. The rim section 14a of the frame cover 14 further depends rearward from the forward surface of the cover to provide a collar that completely surrounds the back of the frame cover, extending to a level approximately the same as the spring clips 14c on the inner side of the frame cover. The rim section 14a with its collar provide depth to the frame cover 14 that encircles and contains the base panel 12 and its periphery and thereby adds to the quality of the appearance of the assembled display device 10. Notched corner sections 14d provided on each side of the lower part of the rim section 14a are formed essentially by removing a beveled portion of the opposite side lengths of the rim section in the area where each side length joins the bottom length of the rim section. The beveled portion removed from the lower side length of the rim section 14a is at a depth on both sides that allow the full width of the advertising sheet 20 to be inserted into the notched corners 14d without bending or folding the sheet in a damaging manner. Similarly, when the advertising sheet 20 is to be removed or replaced, the notched corners 14d allow the smooth withdrawal of the sheet assisted by the underlying finger well 12e in the base panel 12 that helps the handler to grip the advertising sheet properly.

Therefore, it is apparent that the described invention provides an improved device for displaying advertisements and like promotional materials on shopping carts that is easier to mount and manipulate on the shopping carts than those display units heretofore employed. The present inventive device more particularly provides an improved advertising display that can be simply and securely mounted in a proper viewing attitude upon virtually any conventional shopping cart structure and be easily removed therefrom, when necessary, without damaging the display or the shopping cart structure. In addition, the present display device is constructed and assembled for easy installation and removal of the displayed advertisement, when a change is desired in the promotion, without disturbing the mounted position of the device. The described shopping cart display device also presents a more attractive picture-like image of the advertisement displayed therein for greater impression upon the viewing customer. Furthermore, the present inventive device provides a reusable display for shopping carts that is relatively inexpensive to manufacture, easy to assemble and reliable in its operation.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials which may be developed at a future time to perform the same function as the present described embodiment are therefore considered to be part of the present invention. Accordingly, it is understood that this invention is not limited to the particular embodiment described, but rather is intended to cover modifications within the spirit and scope of the present invention as expressed in the appended claims.

What is claimed:

1. A device for displaying an advertising sheet upon a shopping cart, comprising:
    a base panel adapted to be connected to the shopping cart, said base panel having a substantially planar body with a periphery of a predetermined size and shape, the body of said base panel being provided with a plurality of longitudinal slots formed perpendicularly through the body and arranged in a substantially radial pattern extending across the body in more then two different radial directions about the center of the base panel, each of the slots being further formed having a support post transversely extending across the slot intermediate of the length thereof for mounting the base panel to the shopping cart; and
    a cover frame adapted to be assembled to said base panel, said cover frame formed having a rim with a periphery substantially the same size and shape as the body of said base panel and an aperture therethrough to view the advertising sheet inserted between said cover frame and said base panel.

2. A display device according to claim 1, further comprising:
    a plurality of ties routed through respective ones of the longitudinal slots to bind the support post of each slot to the shopping cart and thereby mount the display device thereto.

3. A display device according to claim 1, wherein at least a pair of the longitudinal slots are further formed to connect perpendicularly with respective ones of the radial slots and made to extend in a tangential direction relative to the center of said base panel.

4. A display device according to claim 3, wherein the support post formed within each of the respective longitudinal slots is recessed from the front surface of the body of said base panel.

5. A display device according to claim 1, wherein:
    said base panel is further formed having a finger well recessed into the surface of the body of said base panel along the lower periphery thereof; and
    said cover frame is further formed having a pair of notched corner sections made on opposite sides of the rim along the bottom of the aperture substantially in line with the finger well.

6. A display device according to claim 5, wherein said base panel is further formed having a series of drain holes made through the body of said base panel along the bottom thereof.

7. A display device according to claim 6, wherein:
    said base panel is further formed having a plurality of squared openings made through the body and spaced apart along the periphery thereof; and
    said cover frame is further provided with a plurality of clip members formed on the interior of the rim and spaced apart along the periphery thereof to engage respective ones of the squared openings.

8. A device for displaying an advertising sheet upon a shopping cart, comprising:
    a base panel adapted to be connected to the shopping cart, said base panel having a substantially planar body with a periphery of a predetermined size and shape, the body of said base panel being provided with a radial pattern of slotted openings formed through the body the slotted openings extending in more than two different radial directions about the center of the base panel and having at least one support post transversely extending through each opening in the plane of the body for mounting the base panel to the shopping cart; and
    a cover frame adapted to be assembled to said base panel, said cover frame formed having a rim with a periphery substantially the same size and shape as the body of said base panel and an aperture therethrough to view the advertising sheet when inserted between said cover frame and said base panel.

9. A display device according to claim 8, further comprising:
    a plurality of ties routed through respective ones of the slotted openings and around the support post therein to bind the body of said base panel to the shopping cart.

10. A display device according to claim 9, wherein at least a pair of the slotted openings are formed to connect perpendicularly with respective slotted openings in the radial direction and thereby extend in a tangential direction relative to the center of said base panel.

11. A display device according to claim 9, wherein the support posts formed within each of the respective slotted openings is recessed from the front surface of the body of said base panel.

12. A display device according to claim 8, wherein:
    said base panel is further formed having a finger well recessed into the surface of the body of said base panel along the lower periphery thereof; and
    said cover frame is further formed having a pair of notched corner sections made on opposite sides of the rim along the bottom of the aperture substantially in line with the finger well.

13. A display device according to claim 12, wherein said base panel is further formed having a series of drain holes made through the body of said base panel along the lower periphery thereof.

14. A display device according to claim 13, wherein:
    said base panel is further formed having a plurality of squared openings made through the body and spaced apart along the periphery thereof; and
    said cover frame is further provided with a plurality of clip members formed on the interior of the rim and spaced apart along the periphery thereof to engage respective ones of the squared openings.

* * * * *